(12) United States Patent
Wang et al.

(10) Patent No.: US 12,490,351 B2
(45) Date of Patent: Dec. 2, 2025

(54) DIMMING CIRCUIT AND METHOD FOR USE IN DIMMING CONTROL

(71) Applicant: Richtek Technology Corporation, Hsinchu (TW)

(72) Inventors: Chun-Wen Wang, Hsinchu (TW); Yi-Hua Chang, Pingtung (TW); Hsing-Shen Huang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 167 days.

(21) Appl. No.: 18/458,990

(22) Filed: Aug. 30, 2023

(65) Prior Publication Data

US 2024/0163987 A1    May 16, 2024

Related U.S. Application Data

(60) Provisional application No. 63/383,704, filed on Nov. 15, 2022.

(30) Foreign Application Priority Data

May 10, 2023   (TW) ................... 112117269

(51) Int. Cl.
*H05B 45/10* (2020.01)
*H05B 45/325* (2020.01)

(52) U.S. Cl.
CPC ........... *H05B 45/10* (2020.01); *H05B 45/325* (2020.01)

(58) Field of Classification Search
CPC ........ H05B 45/10; H05B 45/14; H05B 45/20; H05B 45/24; H05B 45/30; H05B 45/305; H05B 45/32; H05B 45/325; H05B 47/10; H05B 47/105; H05B 47/11
See application file for complete search history.

(56) References Cited

U.S. PATENT DOCUMENTS 6,229,271 B1 * 5/2001 Liu ..................... H05B 41/3924
                                                        315/225
2024/0373528 A1 * 11/2024 Chang .................. H05B 45/325

* cited by examiner

*Primary Examiner* — Long Nguyen
(74) *Attorney, Agent, or Firm* — Huan-Yi Lin

(57) ABSTRACT

A dimming circuit is configured to generate a dimming signal to control a brightness of a light emitting device. The brightness is correlated with a duty ratio of the dimming signal. The dimming circuit is configured to count a conduction time of the dimming signal according to a programmable period count code and a programmable brightness code, based upon a fundamental frequency, wherein when the conduction time is less than a conduction time lower limit, based upon a down conversion ratio, the dimming circuit reduces a frequency of the dimming signal according to the programmable period count code and the programmable brightness code, wherein the down conversion ratio is greater than 1 to an extent where a dimming conduction time is greater than or equal to a conduction time lower threshold.

22 Claims, 8 Drawing Sheets

DIMMING CIRCUIT AND METHOD FOR USE IN DIMMING CONTROL

CROSS REFERENCE

The present invention claims priority to the U.S. provisional patent application Ser. No. 63/383,704, filed on Nov. 15, 2022 and claims priority to the TW patent application Ser. No. 112117269, filed on May 10, 2023, all of which foregoing mentioned provisional and nonprovisional patent applications are incorporated herein in their entirety by their reference.

BACKGROUND OF THE INVENTION

Field of Invention

The present invention relates to a dimming circuit; particularly, it relates to such dimming circuit capable of expanding its dimming range through reducing frequency. The present invention also relates to a method for use in dimming control.

Description of Related Art

The following prior art is relevant to the present invention: U.S. Pat. No. 11,145,260B2.

Please refer to FIG. 1, which illustrates signal waveform diagrams depicting signals associated with the operation of a conventional dimming circuit. As shown in FIG. 1, the conventional dimming circuit generates pulse width modulation (PWM) dimming signal Sdim according to a programmable brightness code and a period-tuning count code received by the conventional dimming circuit, wherein the period-tuning count code serves to decide a dimming period Tdim (i.e., while in the meantime, a dimming frequency of the PWM dimming signal Sdim is decided) of the PWM dimming signal Sdim. The programmable brightness code serves to decide a duty ratio of the PWM dimming signal Sdim. The PWM dimming signal Sdim serves to control a brightness of, for example, a dimmable light emitting device (LED). The brightness of the dimmable LED is proportional to the duty ratio of the PWM dimming signal Sdim, as shown by brightness 1 and a conduction time Ton1 of the PWM dimming signal Sdim in FIG. 1.

Although the aforesaid prior art has capacity to execute an operation of dimming based upon instructions, the prior art shown in FIG. 1 has the following drawbacks that: when the PWM dimming signal Sdim has a relatively higher dimming frequency and a relatively smaller duty ratio, a required conduction time of the PWM dimming signal Sdim may possibly become lower than a conduction time lower threshold Ton_min for the dimmable LED controlled by the PWM dimming signal Sdim, such that the required conduction time of the PWM dimming signal Sdim is limited at the conduction time lower threshold Ton_min, thus leading to an actual duty ratio higher than a required lower value and to limiting brightness control of the prior art.

In view of the above, to overcome the drawbacks in the prior art, the present invention proposes a dimming circuit capable of having a relatively smaller duty ratio and achieving brightness control through reducing frequency.

SUMMARY OF THE INVENTION

From one perspective, the present invention provides a dimming circuit, which is configured to operably generate a pulse width modulation (PWM) dimming signal, so as to control a brightness of a dimmable light emitting device, wherein the brightness is correlated with a duty ratio of the PWM dimming signal; the dimming circuit comprising: a signal tuning circuit, which is configured to operably generate a period-tuning count code according to a programmable period count code and generate a brightness-tuning code based upon a programmable brightness code, wherein a value indicative of the programmable period count code is proportional to an initial dimming period of the PWM dimming signal, wherein the initial dimming period is inversely proportional to a corresponding initial dimming frequency, wherein a value indicative of the programmable brightness code is proportional to the duty ratio of the PWM dimming signal; and a signal generation circuit, which is configured to operably generate the PWM dimming signal in accordance with the period-tuning count code and the brightness-tuning code, wherein based upon a fundamental clock signal, the signal generation circuit is configured to operably count according to the period-tuning count code, so as to decide a tuned dimming period and a corresponding tuned dimming frequency of the PWM dimming signal, and wherein based upon the fundamental clock signal, the signal generation circuit is configured to operably count according to the brightness-tuning code, so as to decide a dimming conduction time of the PWM dimming signal; wherein the signal tuning circuit is configured to operably generate the period-tuning count code by multiplying the programmable period count code by a down conversion ratio, so that the tuned dimming frequency is lower than or equal to the initial dimming frequency, wherein the down conversion ratio is greater than or equal to 1 to an extent where the dimming conduction time is greater than or equal to a conduction time lower threshold.

In one embodiment, the signal tuning circuit is configured to operably generate the brightness-tuning code by dividing the programmable brightness code by an initial up conversion ratio and further being multiplied by the down conversion ratio; wherein the initial up conversion ratio is a ratio of the programmable brightness code to an initial brightness code, wherein based upon the fundamental clock signal, a time length obtained by counting according to the initial brightness code is an initial conduction time corresponding to the initial dimming frequency.

In one embodiment, the down conversion ratio is a numerical value equal to 2 to the power of an integer, and the initial up conversion ratio is a numerical value equal to 2 to the power of an integer.

In one embodiment, the signal tuning circuit is configured to operably multiply the programmable period count code and the down conversion ratio equal to 2 to the power of the integer by shifting toward a relatively higher bit direction, so as to generate the period-tuning count code; wherein the signal tuning circuit is configured to operably divide the programmable brightness code by the initial up conversion ratio equal to 2 to the power of the integer by shifting toward a relatively lower bit direction and is configured to operably multiply the programmable brightness code by the down conversion ratio equal to 2 to the power of the integer by shifting toward the relatively higher bit direction, so as to generate the brightness-tuning code.

In one embodiment, the down conversion ratio has k candidate ratios, wherein each candidate ratio is sequentially denoted as $2^n$, where n=0~k−1, wherein the k candidate ratios correspond to k trial conduction time periods, wherein the signal tuning circuit is configured to operably determine a minimum one among the trial conduction time periods, which are greater than or equal to the conduction time lower threshold, in the k trial conduction time periods, and wherein the signal tuning circuit is configured to operably assign the candidate ratio corresponding to the minimum one as the down conversion ratio; wherein k is equal to a difference of a predetermined total bit number and a parsing bit number, wherein the parsing bit number is equal to an exponentiation, with a base of 2, corresponding to the value indicative of the programmable period count code; wherein each of the programmable period count code and the programmable brightness code has the predetermined total bit number.

In one embodiment, through adopting a linear search approach or a non-linear search approach, the signal tuning circuit is configured to operably determine the minimum one among the trial conduction time periods, which are greater than the conduction time lower threshold, in the k trial conduction time periods.

In one embodiment, the signal tuning circuit is further configured to operably generate a conduction time lower threshold code, wherein the conduction time lower threshold code corresponds to the conduction time lower threshold, wherein the conduction time lower threshold code is obtained according to the conduction time lower threshold, a fundamental period of the fundamental clock signal and the down conversion ratio, wherein the signal tuning circuit is further configured to operably compare the conduction time lower threshold code with the brightness-tuning code, wherein the brightness-tuning code is greater than or equal to the conduction time lower threshold code.

In one embodiment, the signal tuning circuit includes: a computation and control circuit, configured to operably decide the down conversion ratio by trial computation according to the programmable period count code, the programmable brightness code, a fundamental period of the fundamental clock signal and the conduction time lower threshold, and configured to operably generate a selection signal according to the down conversion ratio; a routing unit, which is configured to operably perform multiplication operations by 2 to the power of an integer through bit shifting, so as to, in parallel, generate k period candidate codes corresponding to the k candidate ratios, and operably perform division operations by 2 to the power of the integer through bit shifting, so as to, in parallel, generate k brightness candidate codes; and a selector circuit, configured to operably, according to the selection signal, select the corresponding cycle candidate code as the period-tuning count code and select the corresponding brightness candidate code as the brightness-tuning code.

In one embodiment, the signal generation circuit includes: a counter circuit, configured to operably, subsequent to the PWM dimming signal turning to a first state, count according to the brightness-tuning code based upon the fundamental clock signal, so as to trigger the PWM dimming signal turning to a second state, and configured to operably, subsequent to the PWM dimming signal turning to the second state, count according to the period-tuning count code based upon the fundamental clock signal, so as to trigger the PWM dimming signal turning to the first state.

In one embodiment, the dimming circuit further comprises: a communication interface (CI) circuit, configured to operably communicate in compliance with an interface specification to receive the programmable period count code.

In one embodiment, the parsing bit number is a ceiling integer of the exponentiation.

From another perspective, the present invention provides a method, which is configured to operably generate a pulse width modulation (PWM) dimming signal, so as to control a brightness of a dimmable light emitting device, wherein the brightness is correlated with a duty ratio of the PWM dimming signal; the method comprising the following steps: receiving a programmable period count code; receiving a programmable brightness code; and based upon a fundamental frequency, performing a trial calculation according to the programmable period count code and the programmable brightness code, so as to generate a trial conduction time period; wherein when the trial conduction time period is greater than or equal to a conduction time lower threshold, based upon the fundamental frequency, counting according to the programmable period count code and the programmable brightness code, so as to generate the PWM dimming signal; wherein when the trial conduction time period is smaller than the conduction time lower threshold, based upon a down conversion ratio, reducing a frequency of the PWM dimming signal according to the programmable period count code and the programmable brightness code, wherein the down conversion ratio is greater than 1 to an extent where a dimming conduction time of the PWM dimming signal is greater than or equal to a conduction time lower threshold.

In one embodiment, subsequent to the step for receiving the programmable brightness code, the method further comprises the following steps: performing multiplication by the down conversion ratio equal to 2 to the power of an integer by bit shifting, so as to, in parallel, generate k period candidate codes corresponding to the k candidate ratios; and performing dividing by the down conversion ratio equal to 2 to the power of an integer by bit shifting, so as to, in parallel, generate k brightness candidate codes, wherein the down conversion ratio has k candidate ratios, wherein each candidate ratio is sequentially denoted as $2^n$, where n=0~k−1.

In one embodiment, the step for generating the PWM dimming signal according to the programmable period count code and the programmable brightness code, based upon the fundamental frequency, includes the following steps: deciding the down conversion ratio by trial calculation according to the programmable period count code, the programmable brightness code, a fundamental period of the fundamental clock signal and the conduction time lower threshold.

In one embodiment, the step for generating the PWM dimming signal according to the programmable period count code and the programmable brightness code, based upon the fundamental frequency, includes the following steps: generating a selection signal in accordance with the down conversion ratio.

In one embodiment, the step for generating the PWM dimming signal according to the programmable period count code and the programmable brightness code, based upon the fundamental frequency, includes the following steps: selecting the corresponding period candidate code as a period-tuning count code and selecting the corresponding brightness candidate code as a brightness-tuning code; and counting according to the period-tuning count code, based upon the fundamental frequency, so as to decide a tuned dimming period and a corresponding tuned dimming frequency of the PWM dimming signal; and counting according to the brightness-tuning code, based upon the fundamental frequency, so as to decide the dimming conduction time of the PWM dimming signal.

In one embodiment, the method further comprises the following steps: dividing the programmable brightness code by an initial up conversion ratio and further being multiplied by the down conversion ratio to generate the brightness-tuning code; wherein the initial up conversion ratio is a ratio of the programmable brightness code to an initial brightness code, wherein a time length obtained by counting according to the initial brightness code, based upon the fundamental frequency, is an initial conduction time corresponding to an initial dimming frequency; wherein the initial dimming frequency is correlated with a count according to the programmable period count code based upon the fundamental frequency.

In one embodiment, the method further comprises the following steps: multiplying the programmable period count code and the down conversion ratio equal to 2 to the power of the integer by shifting toward a relatively higher bit direction, so as to generate the period-tuning count code; and dividing the programmable brightness code by the initial up conversion ratio equal to 2 to the power of the integer by shifting toward a relatively lower bit direction and multiplying the programmable brightness code by the down conversion ratio equal to 2 to the power of the integer by shifting toward the relatively higher bit direction, so as to generate the brightness-tuning code.

In one embodiment, the down conversion ratio has k candidate ratios, wherein each candidate ratio is sequentially denoted as $2^n$, where n=0~k−1, wherein the k candidate ratios correspond to k trial conduction time periods; wherein the method further comprises the following steps: determining a minimum one among the trial conduction time periods, which are greater than or equal to the conduction time lower threshold, in the k trial conduction time periods; and assigning the candidate ratio corresponding to the minimum one as the down conversion ratio; wherein k is equal to a difference of a predetermined total bit number and a parsing bit number, wherein the parsing bit number is equal to an exponentiation, with a base of 2, corresponding to the value indicative of the programmable period count code; wherein each of the programmable period count code and the programmable brightness code has the predetermined total bit number.

In one embodiment, the step for determining the minimum one among the trial conduction time periods, which are greater than or equal to the conduction time lower threshold, in the k trial conduction time periods includes the following steps: through adopting a linear search approach or a non-linear search approach, determining the minimum one among the trial conduction time periods, which are greater than the conduction time lower threshold, in the k trial conduction time periods.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 1:
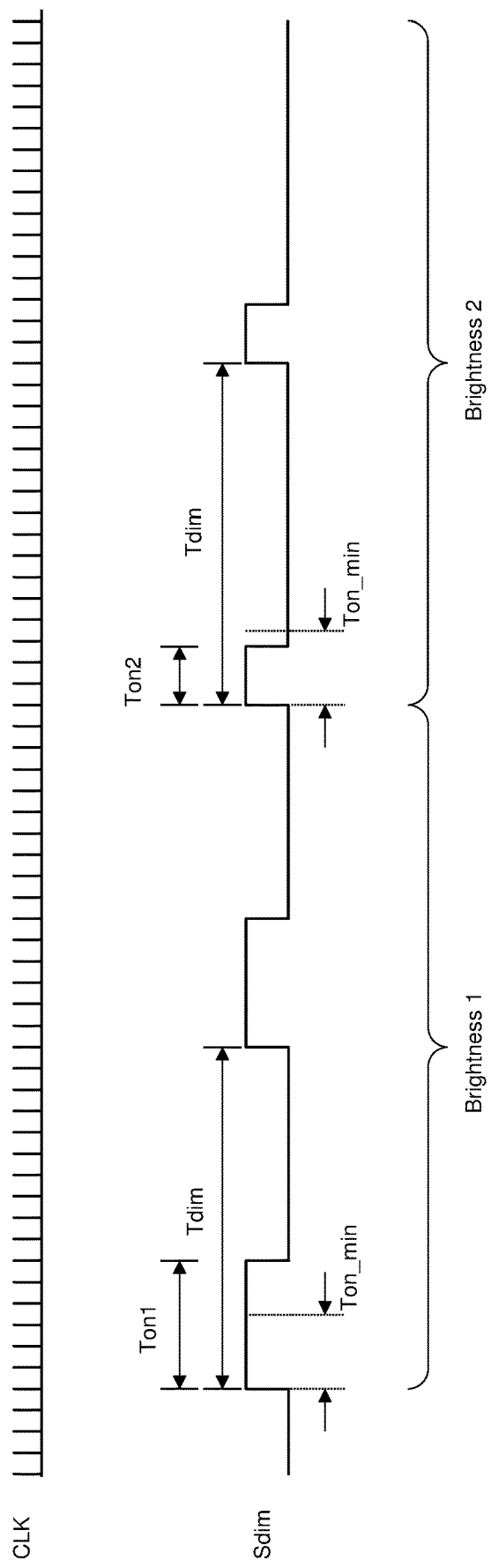
FIG. 1 illustrates signal waveform diagrams depicting signals associated with the operation of a conventional dimming circuit.
Figure 2:
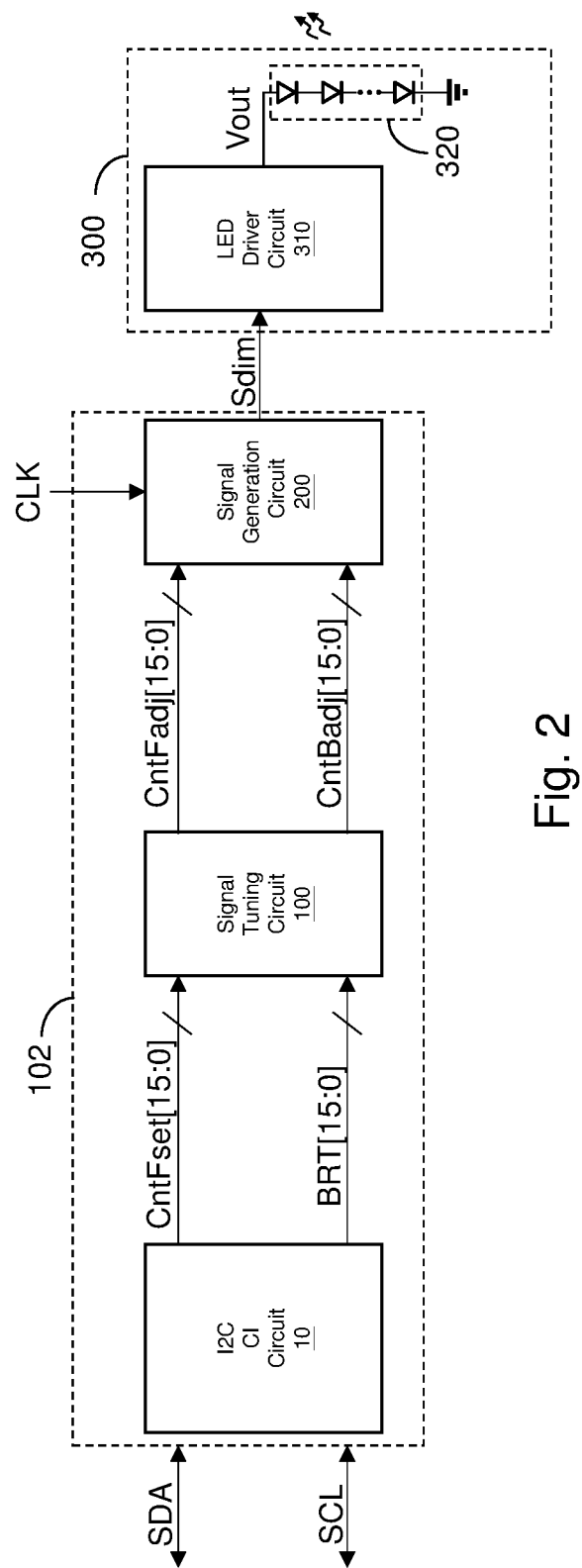
FIG. 2 shows a schematic block diagram of a dimming circuit according to an embodiment of the present invention.

FIG. 2 shows a schematic block diagram of a dimming circuit 102 according to an embodiment of the present invention. The dimming circuit 102 is configured to operably generate a pulse width modulation (PWM) dimming signal Sdim for controlling a brightness of a dimmable light emitting device (LED) 300. In one embodiment, the dimmable LED 300 can include, for example but not limited to, a LED driver circuit 310, wherein the LED driver circuit 310 is configured to operably generate a driving output signal Vout in accordance with the PWM dimming signal Sdim to drive a group of LED lamps 320.

Please still refer to FIG. 2. In one embodiment, the dimming circuit comprises: a communication interface (CI) circuit 10, which is configured to communicate in compliance with an interface specification. In one embodiment, the CI circuit 10 is an I2C (inter-integrated circuit) CI circuit 10 complying with an I2C specification, wherein the I2C CI circuit 10 is configured to operably receive a programmable period count code CntFset and a programmable brightness code BRT via a clock signal SCL and a data signal SDA.

Figure 3A:
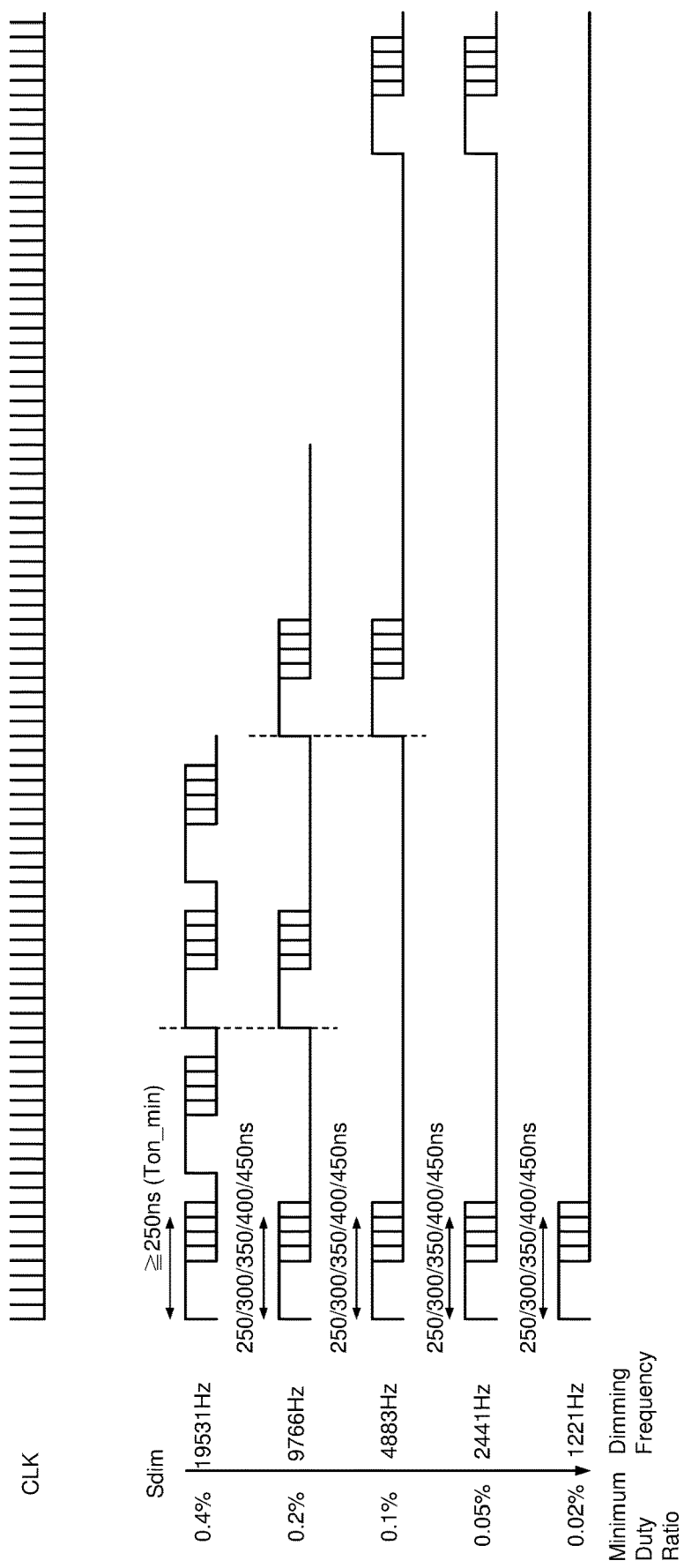
FIG. 3A illustrates signal waveform diagrams depicting signals associated with the operation of a dimming circuit shown in FIG. 2 according to an embodiment of the present invention.
Figure 3B:
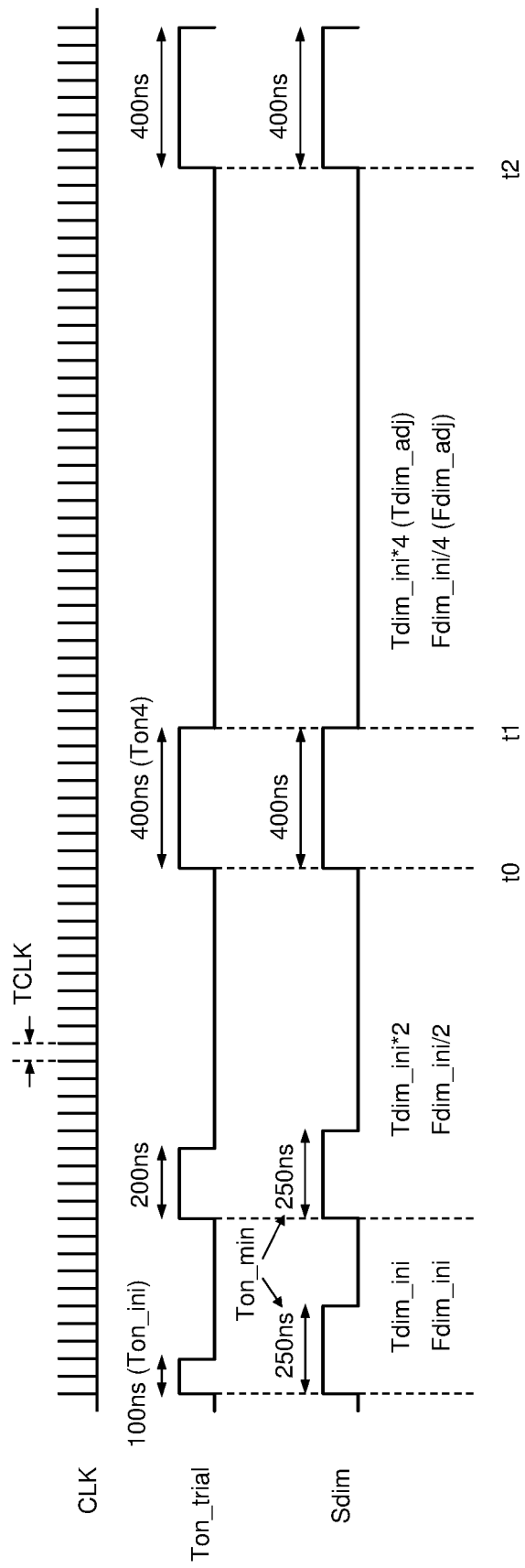
FIG. 3B illustrates signal waveform diagrams depicting signals associated with the operation of a dimming circuit shown in FIG. 2 according to an embodiment of the present invention.

Please refer to FIG. 3A along with FIG. 3B. FIG. 3A illustrates signal waveform diagrams depicting signals associated with the operation of a dimming circuit 102 shown in FIG. 2 according to an embodiment of the present invention. FIG. 3B illustrates signal waveform diagrams depicting signals associated with the operation of a dimming circuit 102 shown in FIG. 2 according to another embodiment of the present invention. The brightness of the dimmable LED 300 is correlated with a duty ratio D of the PWM dimming signal Sdim, wherein the duty ratio D is equal to a quotient of a conduction time Ton divided by a dimming cycle Tdim (i.e., duty ratio D=conduction time Ton/dimming cycle Tdim).

As shown in FIG. 2, in one embodiment, the dimming circuit further comprises: a signal tuning circuit 100 and a signal generation circuit 200. The signal tuning circuit 100 is configured to operably generate the period-tuning count code CntFadj according to a programmable period count code CntFset and generate a brightness-tuning code CntBadj according to the programmable brightness code BRT. A value indicative of the programmable period count code CntFset is proportional to an initial dimming period Tdim_ini (as shown in FIG. 3B) of the PWM dimming signal Sdim, wherein the initial dimming period Tdim_ini is inversely proportional to a corresponding initial dimming frequency Fdim_ini of the PWM dimming signal Sdim. To elaborate in more detail, in one embodiment, the initial dimming period Tdim_ini is equal to a time length obtained by counting according to the programmable period count code CnTFset, based upon a fundamental clock signal CLK, which can be represented as the following expression 1.

Tdim_ini=CntFset*TCLK  (expression 1)

In one embodiment, each of the programmable period count code CntFset, the programmable brightness code BRT, the period-tuning count code CntFadj and the brightness-tuning code CntBadj is for example a binary code having 16 bits (corresponding to a predetermined total bit number TB).

A value indicative of the programmable brightness code BRT is proportional to the duty ratio D of the PWM dimming signal Sdim, wherein the duty ratio D can be represented as the following expression 2.

$$D = \frac{BRT}{2^{TB}}$$  (expression 2)

where TB denotes the aforementioned predetermined total bit number.

When a switching frequency of the PWM dimming signal Sdim corresponds to an initial dimming frequency Fdim_ini, an initial conduction time Ton_ini can be derived through the programmable brightness code BRT, wherein the initial conduction time Ton_ini can be represented as the following expression 3.

Ton_ini=D*Tdim_ini  (expression 3)

In one embodiment, the signal generation circuit 200 is configured to operably generate the PWM dimming signal Sdim in accordance with the period-tuning count code CntFadj and the brightness-tuning code CntBadj. In one embodiment, based upon the fundamental clock signal CLK, the signal generation circuit 200 is configured to operably count according to the period-tuning count code CntFadj, so as to decide a tuned dimming period Tdim_adj and a corresponding tuned dimming frequency Fdim_adj. The tuned dimming period Tdim_adj can be represented as the following expression 4.

Tdim_adj=CntFadj*TCLK  (expression 4)

Moreover, based upon the fundamental clock signal CLK, the signal generation circuit 200 is configured to operably count according to the brightness-tuning code CntBadj, so as to decide a dimming conduction time Ton_dim of the PWM dimming signal Sdim. The fundamental clock signal CLK has a fundamental frequency FCLK and a corresponding fundamental period TCLK.

In one embodiment, the signal tuning circuit 100 is configured to operably generate the period-tuning count code CntFadj by multiplying the programmable period count code CntFset by a down conversion ratio Kdn, so that the tuned dimming frequency Fdim_adj is lower than or equal to the initial dimming frequency Fdim_ini, wherein the down conversion ratio Kdn is greater than or equal to 1 to an extent where the dimming conduction time Ton_dim is greater than or equal to a conduction time lower threshold Ton_min.

Please refer to FIG. 3A. As exemplified by the embodiment shown in FIG. 3A, in a condition where the conduction time lower threshold Ton_min is for example 250 ns, and the dimming frequency Fdim is 19531 Hz, a minimum duty ratio corresponding to the conduction time lower threshold Ton_min is 0.4%. Similarly when the dimming frequency Fdim is 1221 Hz (which is a relatively lower value), a minimum duty ratio corresponding to the conduction time lower threshold Ton_min is lowered down to 0.02%, which can effectively expand a dimming range.

Please refer to FIG. 3B. As exemplified by the embodiment shown in FIG. 3B, in one embodiment, when a conduction time (which is obtained through computation according to the programmable period count code CntFset and the programmable brightness code BRT; e.g., as shown by Ton_ini in FIG. 3B) is smaller than the conduction time lower threshold Ton_min, the conduction time of the PWM dimming signal Sdim will be clamped at the conduction time lower threshold Ton_min (i.e., 250 ns). Under such circumstance, the signal tuning circuit 100 of the present invention is capable of reducing the frequency of the PWM dimming signal Sdim (e.g., the signal tuning circuit 100 of the present invention is capable of reducing the frequency of the PWM dimming signal Sdim by generating the period-tuning count code CntFadj via a down conversion ratio Kdn greater than 1), such that the dimming conduction time Ton_dim (e.g., as shown by a conduction time Ton4 in FIG. 3B) is greater than or equal to a conduction time lower threshold Ton_min.

In one embodiment, the signal tuning circuit 100 can generate the brightness-tuning code CntBadj via computation represented as the following expression 5.

$$CntBadj = \frac{BRT}{Kup\_ini} * Kdn$$  (expression 5)

From one perspective, an initial up conversion ratio Kup_ini can be represented as the following expression 6.

$$Kup\_ini = \frac{2^{TB}}{CntFset} = \frac{2^{TB}}{2^{RES}}$$  (expression 6)

where a parsing bit number RES is equal to an exponentiation, with a base of 2, corresponding to the value indicative of the programmable period count code CntFset. In other words, the parsing bit number RES is equal to log 2(d'CntFset). In one embodiment, preferably, the parsing bit number RES can be obtained by taking the ceiling integer of the aforementioned exponentiation, i.e., RES=[log 2(d'CntFset)]. The initial up conversion ratio Kup_ini is a ratio of a value indicative of the predetermined total bit number TB having a full-bit (i.e., all bits are 1) to a value indicative of the programmable period count code CntFset.

From another perspective, the initial up conversion ratio Kup_ini is a ratio of a value indicative of the programmable brightness code BRT to a value indicative of an initial brightness code CntB_ini. That is, in this case, the initial up conversion ratio Kup_ini can be represented as the following expression 7.

$$\text{Kup\_ini} = \frac{BRT}{\text{CntB\_ini}} \quad \text{(expression 7)}$$

A time length obtained by counting according to the initial brightness code CntB_ini, based upon the fundamental clock signal CLK, is the initial conduction time Ton_ini corresponding to the initial dimming frequency Fdim_ini (i.e., as shown by the initial dimming period Tdim_ini in FIG. 3B). That is, the initial conduction time Ton_ini can be represented as the following expression 8.

Ton_ini=CntB_ini*TCLK (expression 8)

In one embodiment, through adopting a linear search approach or a non-linear search approach, the signal tuning circuit 100 is configured to operably determine the minimum one among the trial conduction time periods, which are greater than the conduction time lower threshold Ton_min, in the k trial conduction time periods Ton_trial[n]. For example, as shown in FIG. 3B, the above-mentioned down conversion ratio Kdn can be determined by successively reducing the frequency via a trial conduction time period Ton_trial. For example, in this embodiment, the initial conduction time Ton_ini is 100 ns, which is smaller than the conduction time lower threshold Ton_min which is 250 ns. As a consequence, in this case, through successively trial reducing the frequency to Fdim_ini/2, Fdim_ini/4, and so on, by altering the down conversion ratio Kdn, the conduction time Ton corresponding to Fdim_ini/4 (i.e., 400 ns) becomes greater than the conduction time lower threshold Ton_min which is 250 ns until the down conversion ratio Kdn is 4. When the initial conduction time Ton_ini is smaller than the conduction time lower threshold Ton_min, frequency reduction, with 2-fold, of the down conversion ratio Kdn can be successively performed until the dimming conduction time Ton_dim is greater than or equal to a conduction time lower threshold Ton_min. The above-said mechanism can be executed via for example a binary search approach.

Figure 4:
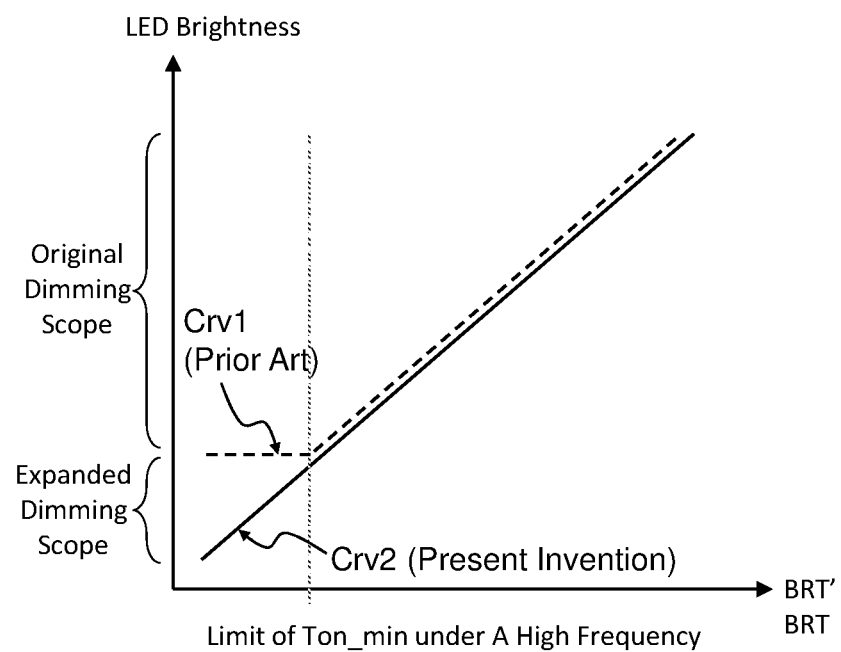
FIG. 4 illustrates a characteristic curve diagram depicting a relationship of an actual brightness against a duty ratio of a PWM dimming signal of a dimming circuit according to an embodiment of the present invention.

FIG. 4 illustrates a characteristic curve diagram depicting a relationship of an actual brightness against a duty ratio D of a PWM dimming signal Sdim of a dimming circuit 102 according to an embodiment of the present invention. Note that a curve Crv1 (illustrated as a dotted line in FIG. 4) indicates a characteristic curve diagram depicting a relationship of an actual brightness against a duty ratio D of a PWM dimming signal Sdim of a prior art dimming circuit. Under a situation where a dimming frequency is a constant, after a programmable brightness code BRT' (corresponding to the curve Crv1) of the prior art has already been limited at the conduction time lower threshold Ton_min, and a duty ratio D and a brightness of the prior art will be clamped at a level. On the contrary, note that a curve Crv2 (illustrated as a solid line in FIG. 4) indicates a characteristic curve diagram depicting a relationship of an actual brightness against a duty ratio D of a PWM dimming signal Sdim of a dimming circuit 102 of the present invention. For the curve Crv2, after a programmable brightness code BRT (corresponding to the curve Crv2) of the present invention has already been limited at the conduction time lower threshold Ton_min during a conduction time Ton, a duty ratio D and a brightness of the present invention can be further expanded even to a much lower level by the aforementioned frequency reduction trial process.

In one embodiment, the down conversion ratio Kdn is a numerical value equal to 2 to the power of an integer. In one embodiment, the initial up conversion ratio Kup_ini is a numerical value equal to 2 to the power of an integer. Under such circumstance, a dimming circuit 102 of the of the present invention can perform the above required multiplication arithmetic operation and division arithmetic operation by bit shifting.

Figure 5A:
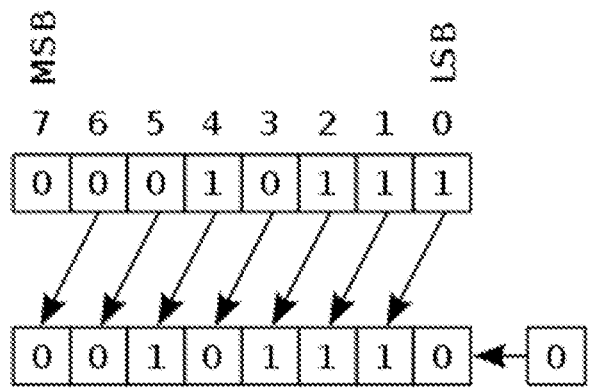
FIG. 5A shows a schematic diagram depicting the details as to how a dimming circuit performs a multiplication arithmetic operation by bit shifting leftward, according to an embodiment of the present invention.
Figure 5B:
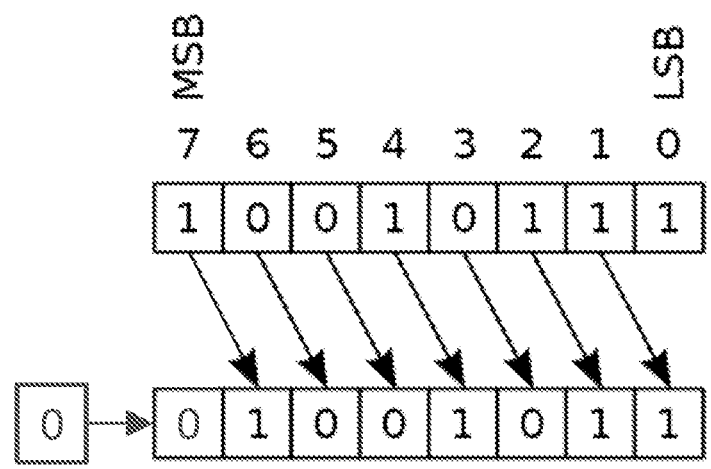
FIG. 5B shows a schematic diagram depicting the details as to how a dimming circuit performs a division arithmetic bit shifting rightward, according to an operation by embodiment of the present invention.

FIG. 5A shows a schematic diagram depicting the details as to how a dimming circuit performs a multiplication arithmetic operation by 2 to the power of an integer by bit shifting leftward, according to an embodiment of the present invention. FIG. 5B shows a schematic diagram depicting the details as to how a dimming circuit performs a division arithmetic operation of 2 to the power of an integer by bit shifting rightward, according to an embodiment of the present invention. It should be understood that the implementations illuminated in FIG. 5A and FIG. 5B as taking 8 bits as an example in the above-mentioned preferred embodiments are only illustrative examples, but not for limiting the broadest scope of the present invention. In other embodiments, it is also practicable and within the broadest scope of the present invention that the implementations illustrated in FIG. 5A and FIG. 5B can have any other numbers of bit. On one hand, the signal tuning circuit 100 is configured to operably multiply a programmable period count code CntFset[15:0] by the down conversion ratio Kdn by bit shifting toward a relatively higher bit direction (e.g., leftward), so as to generate a period-tuning count code CntFadj[15:0]. On the other hand, the signal tuning circuit 100 is configured to operably divide a programmable brightness code BRT[15:0] by the initial up conversion ratio Kup_ini by bit shifting toward a relatively lower bit direction (e.g., rightward), and is configured to operably multiply the programmable brightness code BRT[15:0] by the down conversion ratio Kdn by bit shifting toward the relatively higher bit direction, so as to generate a brightness-tuning code CntBadj[15:0]. In one embodiment, the initial up conversion ratio Kup_ini is greater than or equal to the down conversion ratio Kdn. That is, a net value of Kdn/Kup_ini is equivalent to an integer division arithmetic operation. Under such circumstance, the brightness-tuning code CntBadj[15:0] can be generated by simply bit shifting rightward on the programmable brightness code BRT[15:0].

When the frequency is reduced by a down conversion ratio which is a numerical value a number of 2 to the power of an integer, the down conversion ratio Kdn has k candidate ratios Kdn[n], wherein each candidate ratio in the k candidate ratios Kdn[n] is sequentially and respectively denoted as the following expression 9.

$$\text{Kdn}[n]=2^n, \; n=0\sim(k-1) \quad \text{(expression 9)}$$

where k denotes a positive integer; and where k is equal to a difference between the predetermined total bit number TB and the parsing bit number RES. That is, in this case, k can be represented as the following expression 10.

$$k=TB-RES \quad \text{(expression 10)}$$

The k trial conduction time periods Ton_trial[n] can be obtained through respectively performing trial calculations on the corresponding k candidate ratios Kdn[n]. The signal tuning circuit 100 is configured to operably determine a minimum one among the trial conduction time periods, which are greater than or equal to the conduction time lower threshold Ton_min, in the k trial conduction time periods Ton_trial[n]. Subsequently and accordingly, in this case, the signal tuning circuit 100 is configured to operably assign the candidate ratio corresponding to the minimum one as the down conversion ratio Kdn.

Figure 6:
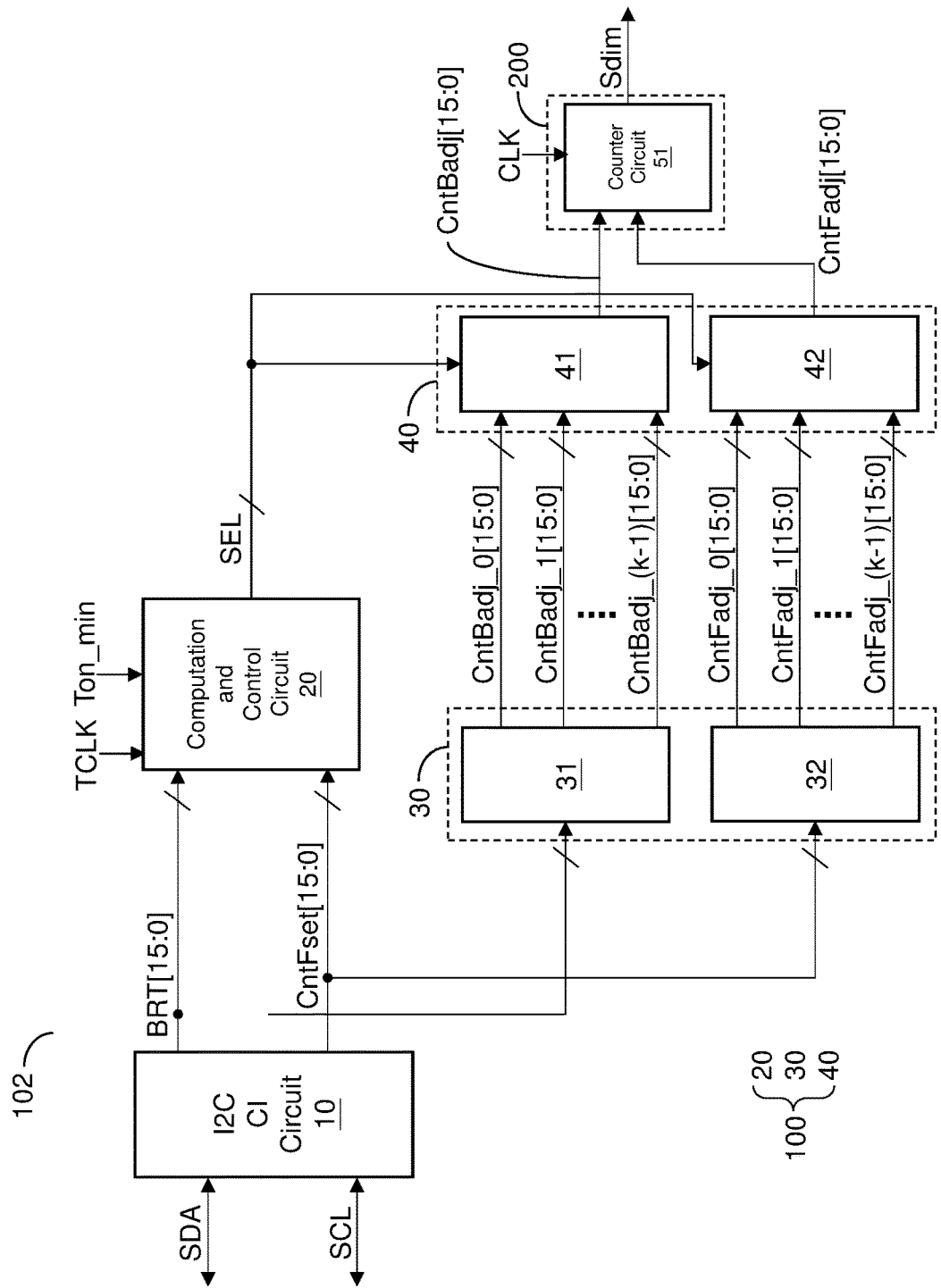
FIG. 6 shows a schematic block diagram of a dimming circuit according to a specific embodiment of the present invention.

FIG. 6 shows a schematic block diagram of a dimming circuit 102 according to a specific embodiment of the present invention. In this embodiment, the signal tuning circuit 100 includes: a computation and control circuit 20, a routing unit 30 and a selector circuit 40. The computation and control circuit 20 is configured to operably decide the down conversion ratio Kdn after trial calculations according to the programmable period count code CntFset, the programmable brightness code BRT, a fundamental period TCLK of the fundamental clock signal CLK and the conduction time lower threshold Ton_min. The computation and control circuit 20 is also configured to operably generate a selection signal SEL in accordance with the down conversion ratio Kdn.

A sub-routing unit 31 of the routing unit 30 is configured to operably perform multiplication and/or division arithmetic operations by 2 to the power of an integer integers by bit shifting, so as to, in parallel, generate k period candidate codes CntFadj_n[15:0] corresponding to the k candidate ratios. A sub-routing unit 32 of the routing unit 30 is configured to operably perform multiplication/division arithmetic operations by 2 to the power of integers by bit shifting, so as to, in parallel, generate k brightness candidate codes CntBadj_n[15:0], wherein n=0~(k−1). According to the selection signal SEL, a sub-selector circuit 41 of the selector circuit 40 is configured to operably select a corresponding one of the period candidate codes CntFadj_n[15:0] as the period-tuning count code CntFadj[15:0]. According to the selection signal SEL, a sub-selector circuit 42 of the selector circuit 40 is configured to operably select a corresponding one of the brightness candidate codes CntBadj_n [15:0] as the brightness-tuning code CntBadj[15:0].

In one embodiment, the signal generation circuit 200 includes a counter circuit 51. The counter circuit 51 is configured to operably, subsequent to the PWM dimming signal Sdim turning to a first state (e.g., as shown by a timing point t0 in FIG. 3B), count according to the brightness-tuning code CntBadj based upon the fundamental clock signal CLK, so as to trigger the PWM dimming signal Sdim turning to a second state. Furthermore, the counter circuit 51 configured to operably, subsequent to the PWM dimming signal Sdim turning to the second state, count according to the period-tuning count code CntFadj based upon the fundamental clock signal CLK, so as to trigger the PWM dimming signal Sdim turning to the first state (e.g., as shown by a timing point t2 in FIG. 3B). Note that, the aforementioned first state can be for example a high level indicative of a conductive state or an enable state, and the aforementioned second state can be for example a low level indicative of a non-conductive state or a disable state.

In one embodiment, the signal tuning circuit 100 is further configured to operably generate a conduction time lower threshold code Cnt_Tmin. The conduction time lower threshold code Cnt_Tmin corresponds to the conduction time lower threshold Ton_min. The conduction time lower threshold code Cnt_Tmin is obtained according to the conduction time lower threshold Ton_min, a fundamental period TCLK of the fundamental clock signal CLK and the down conversion ratio Kdn. In one embodiment, the conduction time lower threshold code Cnt_Tmin can be generated based upon the following expression 11.

$$\text{Cnt\_Tmin} = \frac{\text{Ton\_min}}{TCLK} \qquad \text{(expression 11)}$$

In this embodiment, the signal tuning circuit 100 is further configured to operably compare the conduction time lower threshold code Cnt_Tmin with the brightness-tuning code CntBadj, wherein a resultant tuned brightness-tuning code CntBadj is greater than or equal to the conduction time lower threshold code Cnt_Tmin.

In one embodiment, a conduction time lower threshold code Cnt_Tmin' can be generated based upon the following expression 12.

$$\text{Cnt\_Tmin}' = \frac{\text{Ton\_min}}{TCLK} * Kdn \qquad \text{(expression 12)}$$

In this embodiment, the signal tuning circuit 100 is further configured to operably compare the conduction time lower threshold code Cnt_Tmin' with the programmable brightness code BRT. After the dimming frequency Fdim has already been tuned, a resultant tuned programmable brightness code BRT is greater than or equal to the conduction time lower threshold code Cnt_Tmin'.

Figure 7:
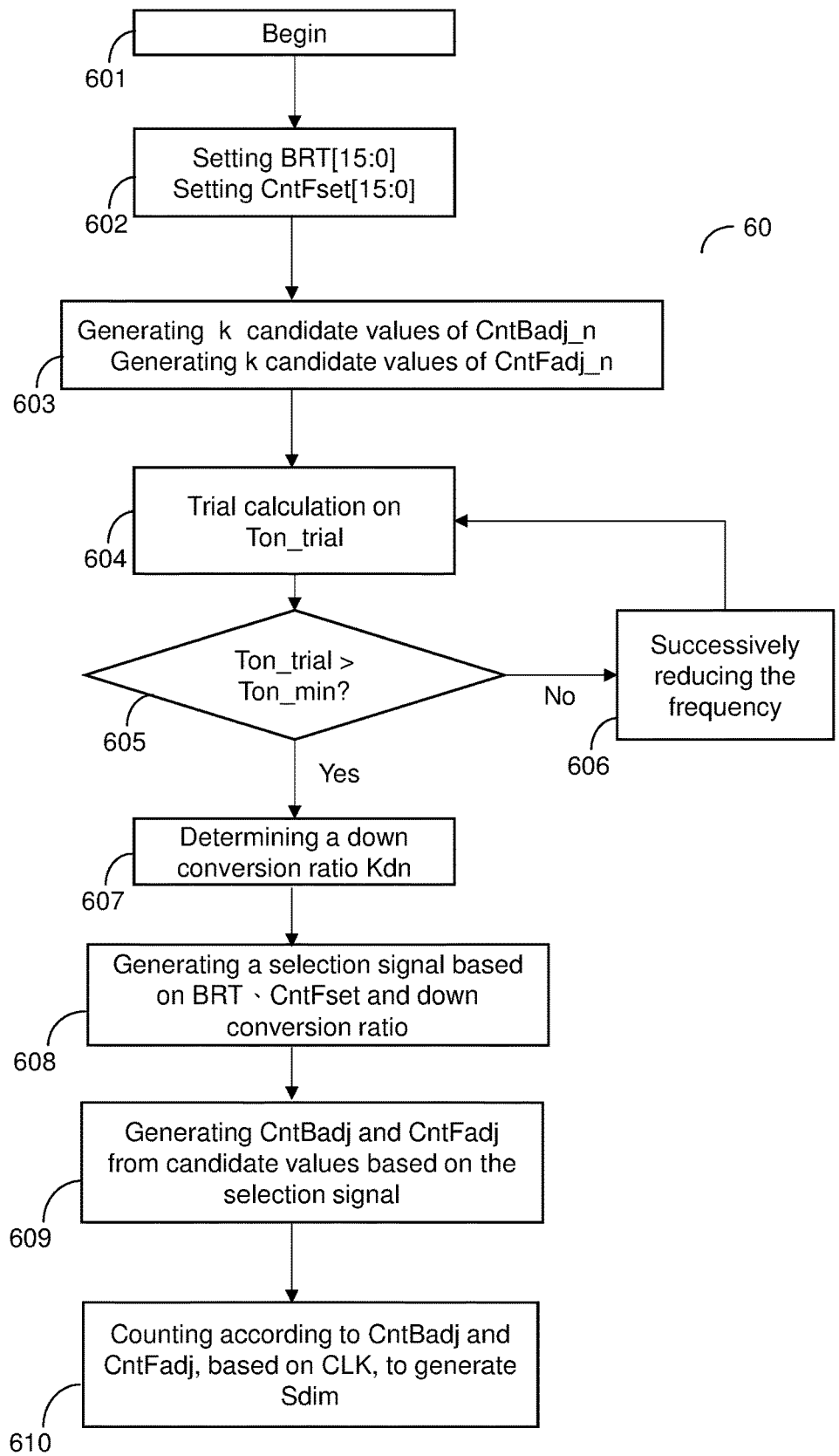
FIG. 7 illustrates a flow chart diagram of a method depicting operational steps for a dimming circuit according to an embodiment of the present invention.

FIG. 7 illustrates a flow chart diagram of a method depicting operational procedure 60 for a dimming circuit 102 according to an embodiment of the present invention. The flow chart diagram of FIG. 7 shows detailed steps of the trial computation flow for the aforementioned tuning of the dimming frequency Fdim and the conduction time Ton, so as to determine a down conversion ratio Kdn, thereby generating a period-tuning count code CntFadj and a brightness-tuning code CntBadj, wherein the PWM dimming signal Sdim is generated accordingly. The operational procedure 60 of FIG. 7 include steps 601~610. In regard to the steps 601~610, please refer to detailed elaboration corresponding to each step in the operational procedure 60 shown in FIG. 7.

It is worthwhile mentioning that, in the present invention, after a down conversion ratio Kdn has already been determined, the PWM dimming signal Sdim can directly reduce the frequency. Or, in an alternative manner, the frequency of the PWM dimming signal Sdim can be successively reduced during a trial process until the conduction time Ton is greater than or equal to the conduction time lower threshold Ton_min.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A dimming circuit, which is configured to operably generate a pulse width modulation (PWM) dimming signal, so as to control a brightness of a dimmable light emitting device, wherein the brightness is correlated with a duty ratio of the PWM dimming signal; the dimming circuit comprising:
a signal tuning circuit, which is configured to operably generate a period-tuning count code according to a programmable period count code and generate a brightness-tuning code based upon a programmable brightness code, wherein a first value indicative of the programmable period count code is proportional to an initial dimming period of the PWM dimming signal, wherein the initial dimming period is inversely proportional to a corresponding initial dimming frequency of the PWM dimming signal, wherein a second value indicative of the programmable brightness code is proportional to the duty ratio of the PWM dimming signal; and
a signal generation circuit, which is configured to operably generate the PWM dimming signal in accordance with the period-tuning count code and the brightness-tuning code, wherein based upon a fundamental clock signal which has a fundamental frequency and a corresponding fundamental period, the signal generation circuit is configured to operably count according to the period-tuning count code, so as to decide a tuned dimming period and a corresponding tuned dimming frequency of the PWM dimming signal, and wherein based upon the fundamental clock signal, the signal generation circuit is configured to operably count according to the brightness-tuning code, so as to decide a dimming conduction time of the PWM dimming signal;
wherein the signal tuning circuit is configured to operably generate the period-tuning count code by multiplying the programmable period count code by a down conversion ratio, so that the tuned dimming frequency is lower than or equal to the initial dimming frequency, wherein the down conversion ratio is greater than or equal to 1 to an extent where the dimming conduction time is greater than or equal to a conduction time lower threshold.

2. The dimming circuit as claimed in claim 1, wherein the signal tuning circuit is configured to operably generate the brightness-tuning code by dividing the programmable brightness code by an initial up conversion ratio and further being multiplied by the down conversion ratio;
wherein the initial up conversion ratio is a ratio of the programmable brightness code to an initial brightness code, wherein based upon the fundamental clock signal, a time length obtained by counting according to the initial brightness code is an initial conduction time corresponding to the initial dimming frequency;
wherein the initial dimming frequency is correlated with a count according to the programmable period count code based upon the fundamental frequency.

3. The dimming circuit as claimed in claim 2, wherein the down conversion ratio is a first numerical value equal to 2 to the power of a first integer, and the initial up conversion ratio is a second numerical value equal to 2 to the power of a second integer.

4. The dimming circuit as claimed in claim 3, wherein the signal tuning circuit is configured to operably multiply the programmable period count code and the down conversion ratio by bit shifting toward a relatively higher bit direction, so as to generate the period-tuning count code;
wherein the signal tuning circuit is configured to operably divide the programmable brightness code by the initial up conversion ratio by bit shifting toward a relatively lower bit direction and is configured to operably multiply the programmable brightness code by the down conversion ratio by bit shifting toward the relatively higher bit direction, so as to generate the brightness-tuning code.

5. The dimming circuit as claimed in claim 3, wherein the down conversion ratio has k candidate ratios, wherein each candidate ratio is sequentially denoted as $2^n$, where n=0~k−1, wherein the k candidate ratios correspond to k trial conduction time periods, wherein the signal tuning circuit is configured to operably determine a minimum one among the trial conduction time periods, which are greater than or equal to the conduction time lower threshold, in the k trial conduction time periods, and wherein the signal tuning circuit is configured to operably assign the candidate ratio corresponding to the minimum one as the down conversion ratio;
wherein k is equal to a difference of a predetermined total bit number and a parsing bit number, wherein the parsing bit number is equal to an exponentiation, with a base of 2, corresponding to the first value indicative of the programmable period count code;
wherein each of the programmable period count code and the programmable brightness code has the predetermined total bit number.

6. The dimming circuit as claimed in claim 5, wherein through adopting a linear search approach or a non-linear search approach, the signal tuning circuit is configured to operably determine the minimum one among the trial conduction time periods, which are greater than the conduction time lower threshold, in the k trial conduction time periods.

7. The dimming circuit as claimed in claim 5, wherein the signal tuning circuit is further configured to operably generate a conduction time lower threshold code, wherein the conduction time lower threshold code corresponds to the conduction time lower threshold, wherein the conduction time lower threshold code is obtained according to the conduction time lower threshold, the fundamental period of the fundamental clock signal and the down conversion ratio, wherein the signal tuning circuit is further configured to operably compare the conduction time lower threshold code with the brightness-tuning code, wherein the brightness-tuning code is greater than or equal to the conduction time lower threshold code.

8. The dimming circuit as claimed in claim 6, wherein the signal tuning circuit includes:
a computation and control circuit, configured to operably decide the down conversion ratio by trial computation according to the programmable period count code, the programmable brightness code, the fundamental period of the fundamental clock signal and the conduction time lower threshold, and configured to operably generate a selection signal according to the down conversion ratio;
a routing unit, which is configured to operably perform multiplication operations by 2 to the power of third integers through bit shifting, so as to, in parallel, generate k period candidate codes corresponding to the k candidate ratios, and operably perform division operations by 2 to the power of fourth integers through bit shifting, so as to, in parallel, generate k brightness candidate codes; and a selector circuit, configured to operably, according to the selection signal, select a corresponding one of the k period candidate codes as the period-tuning count code and select a corresponding one of the k brightness candidate codes as the brightness-tuning code.

9. The dimming circuit as claimed in claim 6, wherein the signal generation circuit includes:

a counter circuit, configured to operably, subsequent to the PWM dimming signal turning to a first state, count according to the brightness-tuning code based upon the fundamental clock signal, so as to trigger the PWM dimming signal turning to a second state, and configured to operably, subsequent to the PWM dimming signal turning to the second state, count according to the period-tuning count code based upon the fundamental clock signal, so as to trigger the PWM dimming signal turning to the first state.

10. The dimming circuit as claimed in claim 1, wherein the dimming circuit further comprises:

a communication interface (CI) circuit, configured to operably communicate in compliance with an interface specification to receive the programmable period count code.

11. The dimming circuit as claimed in claim 5, wherein the parsing bit number is a ceiling integer of the exponentiation.

12. A method, which is configured to operably generate a pulse width modulation (PWM) dimming signal, so as to control a brightness of a dimmable light emitting device, wherein the brightness is correlated with a duty ratio of the PWM dimming signal; the method comprising the following steps:

receiving a programmable period count code;
receiving a programmable brightness code; and
based upon a fundamental clock signal which has a fundamental frequency and a corresponding fundamental period, performing a trial calculation according to the programmable period count code and the programmable brightness code, so as to generate a trial conduction time period;
wherein when the trial conduction time period is greater than or equal to a conduction time lower threshold, based upon the fundamental frequency, counting according to the programmable period count code and the programmable brightness code, so as to generate the PWM dimming signal;
wherein when the trial conduction time period is smaller than the conduction time lower threshold, based upon a down conversion ratio, reducing a frequency of the PWM dimming signal according to the programmable period count code and the programmable brightness code, wherein the down conversion ratio is greater than 1 to an extent where a dimming conduction time of the PWM dimming signal is greater than or equal to the conduction time lower threshold.

13. The method as claimed in claim 12, wherein the down conversion ratio has k candidate ratios, wherein each candidate ratio is sequentially denoted as $2^n$, where $n=0\sim k-1$, wherein subsequent to the step for receiving the programmable brightness code, the method further comprises the following steps:

performing multiplication operations by 2 to the power of first integers through bit shifting, so as to, in parallel, generate k period candidate codes corresponding to the k candidate ratios; and performing division operations by 2 to the power of second integers through bit shifting, so as to, in parallel, generate k brightness candidate codes.

14. The method as claimed in claim 13, wherein the step for generating the PWM dimming signal according to the programmable period count code and the programmable brightness code, based upon the fundamental frequency, includes the following steps:

deciding the down conversion ratio by trial calculation according to the programmable period count code, the programmable brightness code, the fundamental period of the fundamental clock signal and the conduction time lower threshold.

15. The method as claimed in claim 14, wherein the step for generating the PWM dimming signal according to the programmable period count code and the programmable brightness code, based upon the fundamental frequency, further includes the following steps:

generating a selection signal in accordance with the down conversion ratio.

16. The method as claimed in claim 14, wherein the step for generating the PWM dimming signal according to the programmable period count code and the programmable brightness code, based upon the fundamental frequency, further includes the following steps:

selecting a corresponding one of the k period candidate codes as a period-tuning count code and selecting a corresponding one of the k brightness candidate codes as a brightness-tuning code; and
counting according to the period-tuning count code, based upon the fundamental frequency, so as to decide a tuned dimming period and a corresponding tuned dimming frequency of the PWM dimming signal; and
counting according to the brightness-tuning code, based upon the fundamental frequency, so as to decide the dimming conduction time of the PWM dimming signal.

17. The method as claimed in claim 16, further comprising the following steps:

dividing the programmable brightness code by an initial up conversion ratio and further being multiplied by the down conversion ratio to generate the brightness-tuning code;
wherein the initial up conversion ratio is a ratio of the programmable brightness code to an initial brightness code, wherein a time length obtained by counting according to the initial brightness code, based upon the fundamental frequency, is an initial conduction time corresponding to an initial dimming frequency of the PWM dimming signal;
wherein the initial dimming frequency is correlated with a count according to the programmable period count code based upon the fundamental frequency.

18. The method as claimed in claim 17, wherein the down conversion ratio is a first numerical value equal to 2 to the power of a third integer, and the initial up conversion ratio is a second numerical value equal to 2 to the power of a fourth integer.

19. The method as claimed in claim 18, further comprising the following steps:

multiplying the programmable period count code and the down conversion ratio by bit shifting toward a relatively higher bit direction, so as to generate the period-tuning count code; and dividing the programmable brightness code by the initial up conversion ratio by bit shifting toward a relatively lower bit direction and multiplying the programmable brightness code by the down conversion ratio by bit shifting toward the relatively higher bit direction, so as to generate the brightness-tuning code.

20. The method as claimed in claim 19, wherein the k candidate ratios correspond to k trial conduction time periods;
wherein the method further comprises the following steps:
determining a minimum one among the trial conduction time periods, which are greater than or equal to the conduction time lower threshold, in the k trial conduction time periods; and
assigning the candidate ratio corresponding to the minimum one as the down conversion ratio;
wherein k is equal to a difference of a predetermined total bit number and a parsing bit number, wherein the parsing bit number is equal to an exponentiation, with a base of 2, corresponding to the value indicative of the programmable period count code;
wherein each of the programmable period count code and the programmable brightness code has the predetermined total bit number.

21. The method as claimed in claim 20, wherein the step for determining the minimum one among the trial conduction time periods, which are greater than or equal to the conduction time lower threshold, in the k trial conduction time periods includes the following steps:
through adopting a linear search approach or a non-linear search approach, determining the minimum one among the trial conduction time periods, which are greater than the conduction time lower threshold, in the k trial conduction time periods.

22. The method as claimed in claim 20, wherein the parsing bit number is a ceiling integer of the exponentiation.

* * * * *